US010423009B1

(12) United States Patent
Pattikonda et al.

(10) Patent No.: US 10,423,009 B1
(45) Date of Patent: Sep. 24, 2019

(54) SMART READING GLASSES HAVING AUTOMATIC FOCUS (71) Applicants: Ram Pattikonda, Plano, TX (US); Shariq Hamid, Plano, TX (US); Arshadev Pravas Vasudevan, Trivandrum (IN)

(72) Inventors: Ram Pattikonda, Plano, TX (US); Shariq Hamid, Plano, TX (US); Arshadev Pravas Vasudevan, Trivandrum (IN)

(*) Notice: Subject to any disclaimer, the term of this patent is extended or adjusted under 35 U.S.C. 154(b) by 31 days.

(21) Appl. No.: 15/884,823

(22) Filed: Jan. 31, 2018

Related U.S. Application Data (60) Provisional application No. 62/453,108, filed on Feb. 1, 2017.

(51) Int. Cl.
*G02C 5/12* (2006.01)
*G02C 5/04* (2006.01)
*G02C 7/06* (2006.01)
*G02C 11/06* (2006.01)

(52) U.S. Cl.
CPC ............... *G02C 5/124* (2013.01); *G02C 5/04* (2013.01); *G02C 7/06* (2013.01); *G02C 11/06* (2013.01)

(58) Field of Classification Search
CPC . G02C 5/124; G02C 7/06; G02C 5/04; G02C 11/06
USPC ....................................... 351/41, 55
See application file for complete search history.

(56) References Cited

U.S. PATENT DOCUMENTS

| | | | | |
|---|---|---|---|---|
| 5,598,232 A | * | 1/1997 | Pronesti | G02C 7/06 351/54 |
| 7,457,434 B2 | * | 11/2008 | Azar | G02C 7/083 351/159.41 |
| 8,482,488 B2 | * | 7/2013 | Jannard | G02C 11/06 345/8 |

* cited by examiner

*Primary Examiner* — Tuyen Tra
(74) *Attorney, Agent, or Firm* — Michael Diaz (57) ABSTRACT

Glasses having a frame and two lenses. Each of the lenses is attached to the frame. A distance measurement module determines a distance to an object viewed from the glasses. The glasses also include a motion control module for raising and lowering the first and second lens and a controller for determining when it is appropriate to raise the first and second lenses. When the controller determines that it is appropriate to raise the first and second lenses to a raised position, the controller directs the motion control module to raise the first and second lenses. In one embodiment, each lens has a plurality of lens sections which may provide different types of focus. The lenses may be raised or lowered appropriately to allow view through one of the lens sections.

23 Claims, 14 Drawing Sheets

SMART READING GLASSES HAVING AUTOMATIC FOCUS

RELATED APPLICATIONS

This utility application claims the benefit of U.S. Provisional Patent Application Ser. No. 62/453,108 by Ram Pattikonda and Shariq Hamid filed Feb. 1, 2017 and is hereby incorporated by reference.

BACKGROUND OF THE INVENTION

Field of the Invention

This invention relates to glasses. Specifically, and not by way of limitation, the present invention relates to smart glasses providing automatic near and far focus.

Description of the Related Art

As humans age, it is typical to experience blurred near vision when reading, sewing or working at the computer. This problem, called Presbyopia, is caused by the stiffening of the eye lens muscles as people age. Currently, people suffering from this problem utilize reading glasses, which requires the user to wear the glasses while looking at near objects and take off while looking at far objects. Other alternative solutions are to use bi-focal or progressive lenses. These lenses also suffer from several disadvantages. The user must look down to observe close in objects, such as when reading, and while looking down, far objects will not be clear. They also have blurry areas in the border of different focus areas which can be annoying for viewing. There are some newer technologies having a dynamic focus on a single lens that can adjust focus based on the user's view. One such solution uses two lenses that can be rotated with each other to change focus. Another solution uses electric field on liquid crystal layer to change focus dynamically. These solutions suffer from various complexities and are currently not commercially viable. Additionally, these newer techniques suffer from the reliability of electro-optical function or mechanical and size complexities or high cost or optical clarity. Due to these limitations, currently there is no feasible solution to address the user's presbyopia problem.

It would be advantageous to have glasses which provide for a dynamic focus for the user's eyes. The glasses would enable seeing both far off objects as well as near in objections which are cost effective, slim, elegant and commercially viable. It is an object of the present invention to provide such an apparatus.

SUMMARY OF THE INVENTION

In one aspect, the present invention is directed to glasses having a frame and two lenses. Each of the lenses is attached to the frame. A distance measurement module determines a distance to an object viewed from the glasses. The glasses also include a motion control module for moving the first and second lens and a controller for determining when it is appropriate to move the first and second lenses. When the controller determines that it is appropriate to move the first and second lenses to a raised position, the controller directs the motion control module to move the first and second lenses to a new position. In one embodiment, each lens has a lower lens section and an upper lens section. Each lens section may provide a different type of focus, such as near and far focus. As the user wears the glasses, the lenses may be positioned in a low position which allows the user to view through the upper lens section and a raised position to allow the user to view through the lower lens section by the motion control module. In another embodiment of the present invention, each lens has three lens section having different types of focus, such as a far, intermediate and near focus. The lenses may be raised or lowered appropriate to allow view through one of the lens sections.

BRIEF DESCRIPTION OF THE DRAWINGS

FIG. 98B illustrates the smart glasses utilizing airbags to move the lenses within the frame in an elevated position;

DESCRIPTION OF THE INVENTION

Figure 1:
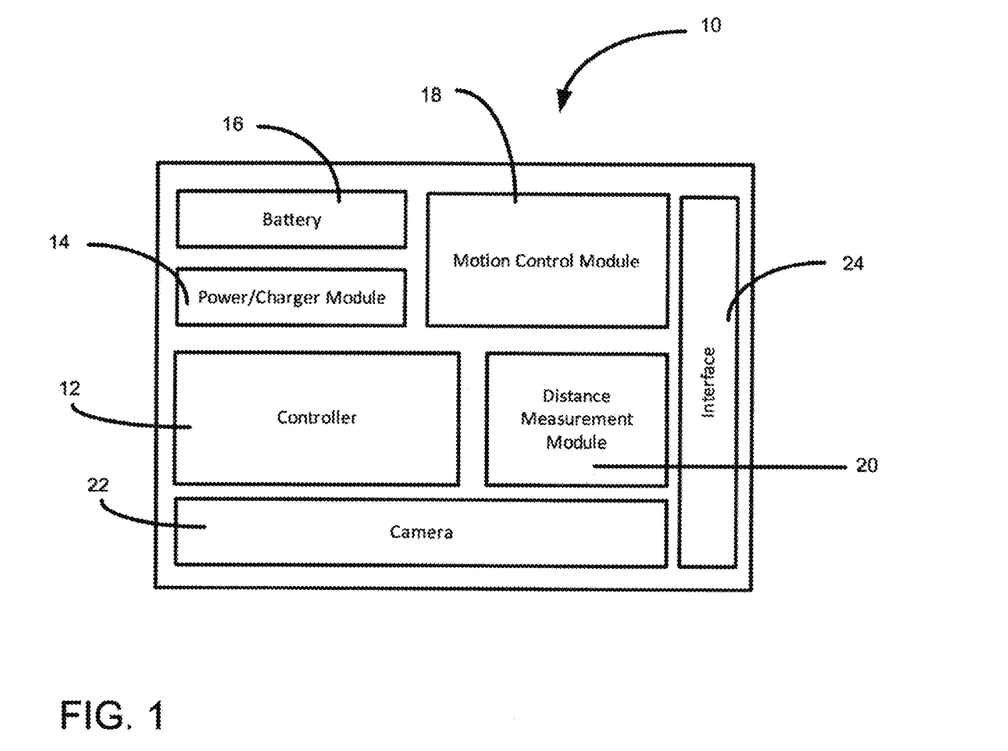
FIG. 1 is a simplified block diagram of the major components of smart glasses according to one embodiment of the present invention.

The present invention is smart glasses providing dynamic focus to a user. FIG. 1 is a simplified block diagram of the major components of smart glasses 10 according to one embodiment of the present invention. The smart glasses include a controller 12, a power/charger module 14, a battery 16, a motion control module 18, a distance measurement module 20, an optional camera 22, and an interface 24. The controller includes a processor for processing information received from the distance measurement module 20, the motion control module 18 and any other mechanism providing relevant information for determining a correct lens for usage by a user. The distance measurement module 20 is preferably located in the center of the frame of the glasses 10 between the eyes (or somewhere in the frame pointing at the head direction) so that it is directed at the object that the user is viewing when seeing straight. The distance measurement module is capable of measuring distance to an object utilizing techniques, such as time of flight measurement (i.e., measure the time taken for the light to reflect back from an object) [since it is a term of art, I don't think we need to discuss. ultrasonic or other techniques. The optional camera 22 also provides more details on the object being viewed, such as whether focus adjustment is needed for the object being viewed. Touch or buttons provide control to the user, which may be used on the interface 24. The user may switch off the unit or switch to a manual control if needed through the interface 24. In manual mode, the user can position the lens as desired by the user based on the object he is viewing. In auto mode, the controller determines the correct lens to user and positions the lenses based on the object being viewed. The power/charger module 14 controls the power usage and charging features of the smart glasses 10. The smart glasses stores power within the battery 16. The motion control module 18 controls the movement of the glass portion of the smart glasses. The motion control module may move the lenses (glass portion of the smart glasses) in a wide variety of ways and still remain in the scope of the present invention.

Figure 2:
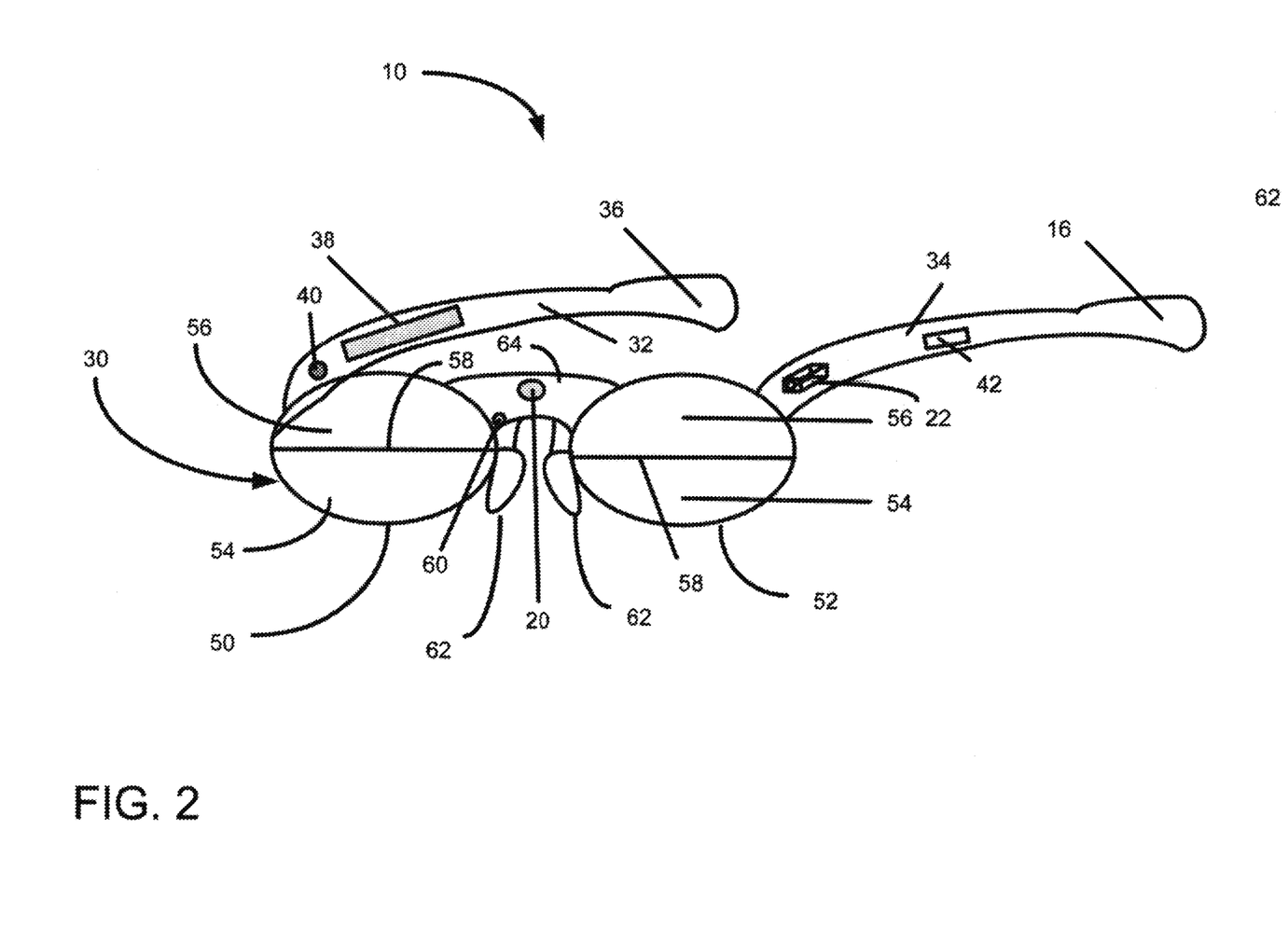
FIG. 2 is a front view of the smart glasses in one embodiment of the present invention.

FIG. 2 is a front view of the smart glasses 10 in one embodiment of the present invention. The smart glasses include a frame 30 having two arms 32 and 34. One of the arms 32 may include an optional pump 36 for moving the lenses, a touch or button area 38, and a light emitting diode (LED) indicator 40. The other arm 34 may include the battery 15, optional speaker 42, and the optional camera 22. The frame contains two lenses 50 and 52. Each lens may be divided into two sections providing different types of focus. In one embodiment, each lens include a near focus lens section 54 and a far focus lens section 56 divided at a separation line 58. The smart glasses may include an optional mic 60 and nose pads 62 attached to a support structure 64 or directly to the lenses. The support structure may be part of the frame 30 and used for coupling the lenses adjacent each other. The speaker 42 may provide the status of the lens position and current mode of operation. The mic 60 along with the speaker 42 may provide smart two-way communication to the user. The LED indicator 40 located in the front portion of the temple may also provide status indications. The larger components, such as battery and optional micro-pump can be located in the temple area behind the ear of each arm of the smart glasses.

In a first embodiment of the present invention, as depicted in FIG. 2, the distance measurement module 20 provides measurement of the distance to the object that the user is viewing. The distance measurement module 20 is located in the middle of the smart glasses 10, pointing outward to the viewed object. In one embodiment, a time of flight method is used where the distance is calculated based on time it takes for light emitted from the distance measurement module to reflect from the viewed object and return to the user.

Figure 3A:
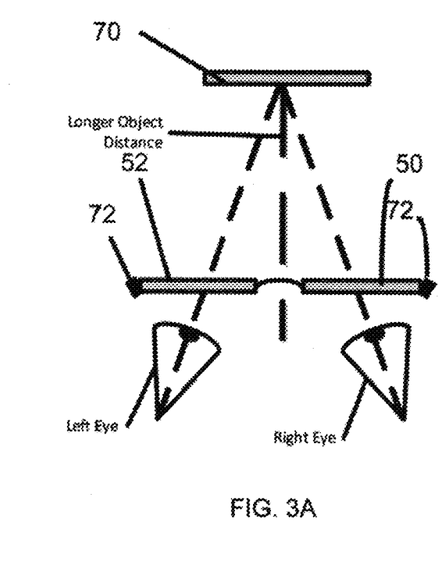
FIG. 3A is a top view of the smart glasses utilizing a pupil tracking system for viewing an object at a longer distance.
Figure 3B:
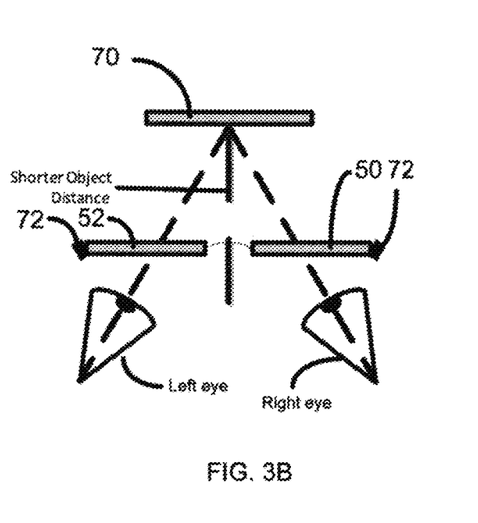
FIG. 3B is a top view of the smart glasses utilizing the pupil tracking system with the object viewed at a shorter distance.

In another embodiment of the present invention, the user's pupils are tracked for determining the placement of the appropriate lens. FIG. 3A is a top view of the smart glasses utilizing a pupil tracking system for viewing an object 70 at a longer distance. FIG. 3B is a top view of the smart glasses utilizing the pupil tracking system with the object viewed at a shorter distance. The pupil tracking system utilizes a plurality of pupil tracking cameras 72 placed in the frame 30. These cameras measure the pupil position and angle at which the eye ball of the user is pointing. This angle changes with what the user is seeing. If user is seeing a far object 70 (FIG. 3A), the eye ball angle is less. If the user is seeing close object 70 (FIG. 3B), this angle will be higher. Based on this angle and using triangulation techniques, the distance to the object is determined. This embodiment also has the additional advantage where the user's eye position is known in a vertical direction. The near focus portion of the glass can be then raised up to cover the user's eye. Additionally, this embodiment can also provide applications such as monitoring user's drowsiness through eye blink pattern. In such an embodiment, the user may be warned when the user is drowsy when driving.

A multi-focal lens such as bi-focal, tri-focal or progressive lens typically has far focus on top, intermediate focus in the center section and near focus on the bottom section of the lens. With the smart glasses 10, the lenses 50 and 52 are moved up and down to bring these areas of focus in front of the user's pupil based on the distance of the object that the user is viewing. Normally, the user views through the upper portion of the lens. When the user sees an object up close, it is detected by the distance measuring module 20 and the lenses 50 and 52 or the frame 30 holding the lenses is raised to bring the lower near-focus lens in front of the user's pupil. Since the lens is located right in front of the eyes, a small movement would be sufficient to change the focus for user's eye. This small movement required can be achieved by different mechanisms such as a pneumatic air pump, a solenoid, rotating motor with gear nut or magnets. All these motions can be achieved using micro components needed in a small area of the frame and incorporated in the motion control module 18. It should be understood that although two lens sections are depicted in the illustrations, the present invention may use any number of lens sections. For example, the lenses 50 and 52 may be comprised of a near focus lens section 54 located on an upper portion of each lens, a far focus lens section 56 located on the lower portion of the lens and an intermediate focus lens section (not shown) located between the near focus lens section 54 and the far focus lens section 56. The controller raises and lowers the lenses the appropriate amount to allow viewing from the appropriate lens section. Additionally, besides the variance in the number of lens section, the type of focus used in each lens section may vary from discussed above.

In one embodiment of the present invention, the frame 30 with the lenses 50 and 52 is lifted at the nose pad area with a pneumatic or motor screw. Utilizing the pneumatic version, a micro-air pump, such as a piezo pump along with an airbag is used for lift. The micro-pump, such as a piezo pump, may be hidden on back side of the arm/temple with a small air tube coming to the nose pad to drive the frame lift. When near focus is needed, air is pumped into an airbag or bellow located near the nose pad, lifting the frame to bring the near focus section of the lens into the user's view. When the far focus lens section is needed, the air is released from the nose pad area, lowering the frame to bring the far focus lens section of the lens into user's view. For the motor screw embodiment, a micro-motor with a screw and nut mechanism is located in the center of the frame near nose pad area. Rotation of the motor drives the nut up and down, further pushing the frame down or up.

Figure 4A:
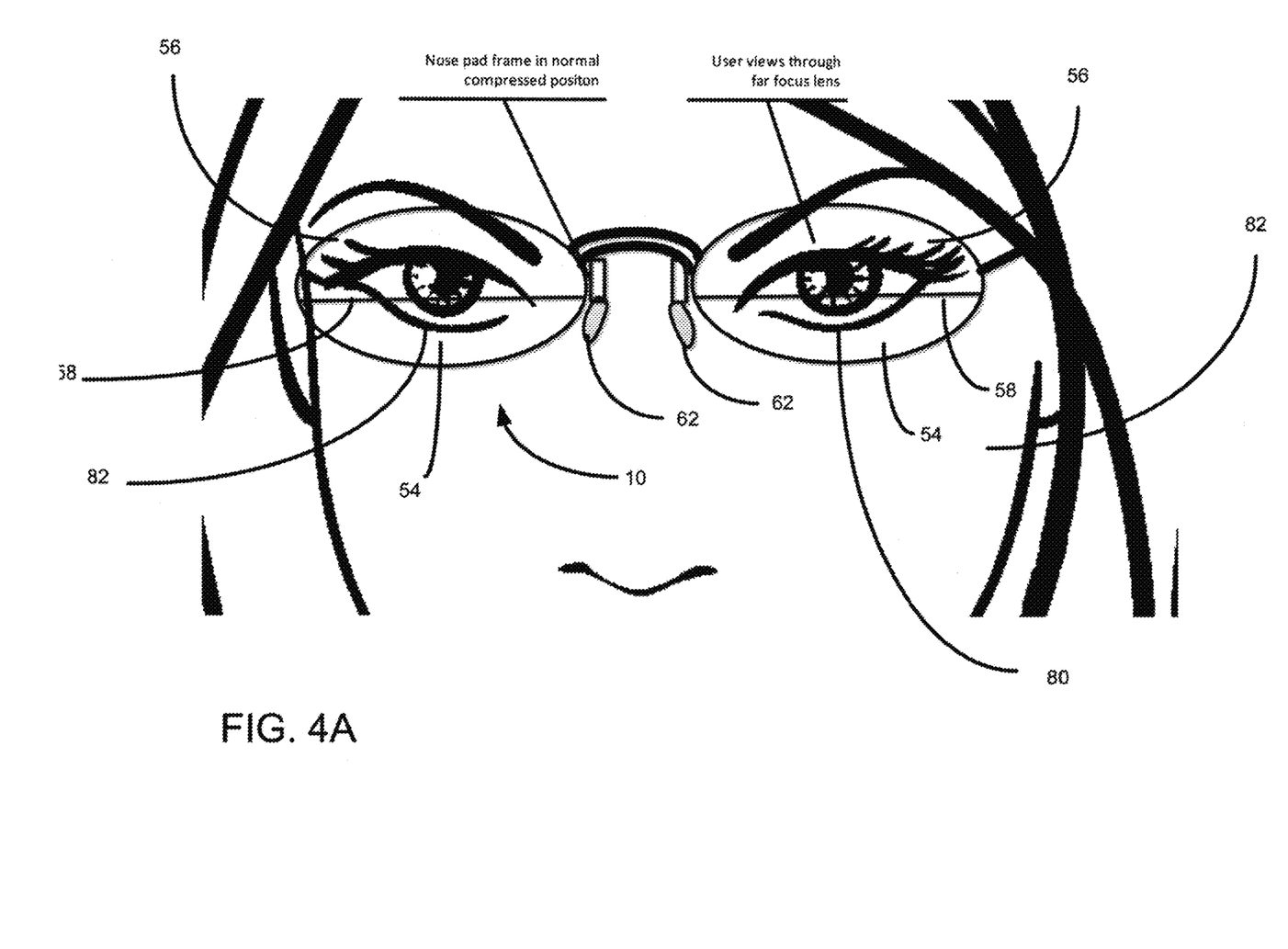
FIG. 4A illustrates the smart glasses worn by a user utilizing the far focus section.
Figure 4B:
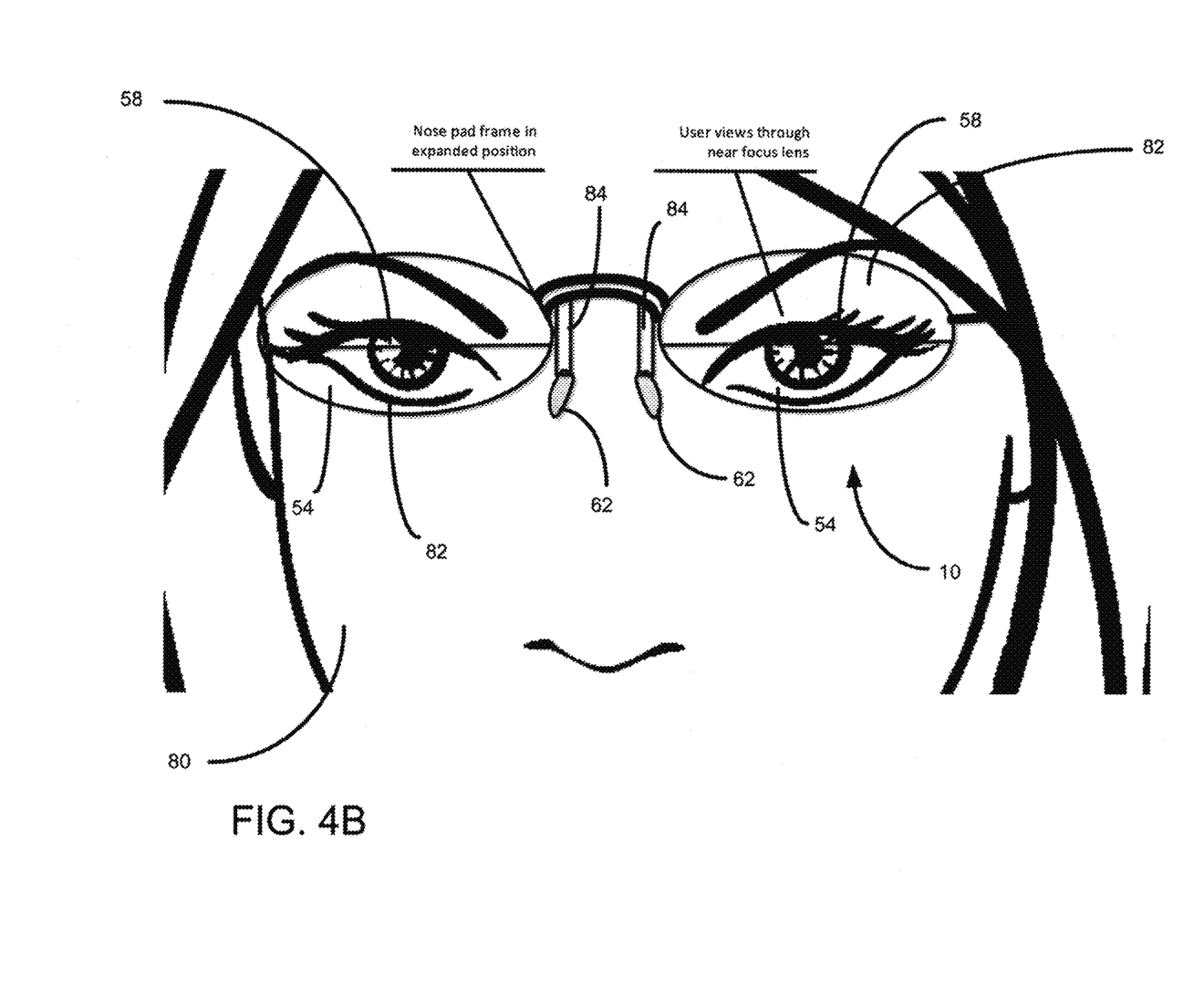
FIG. 4B illustrates the smart glasses worn by the user utilizing the near focus section.
Figures 5A, 5B:
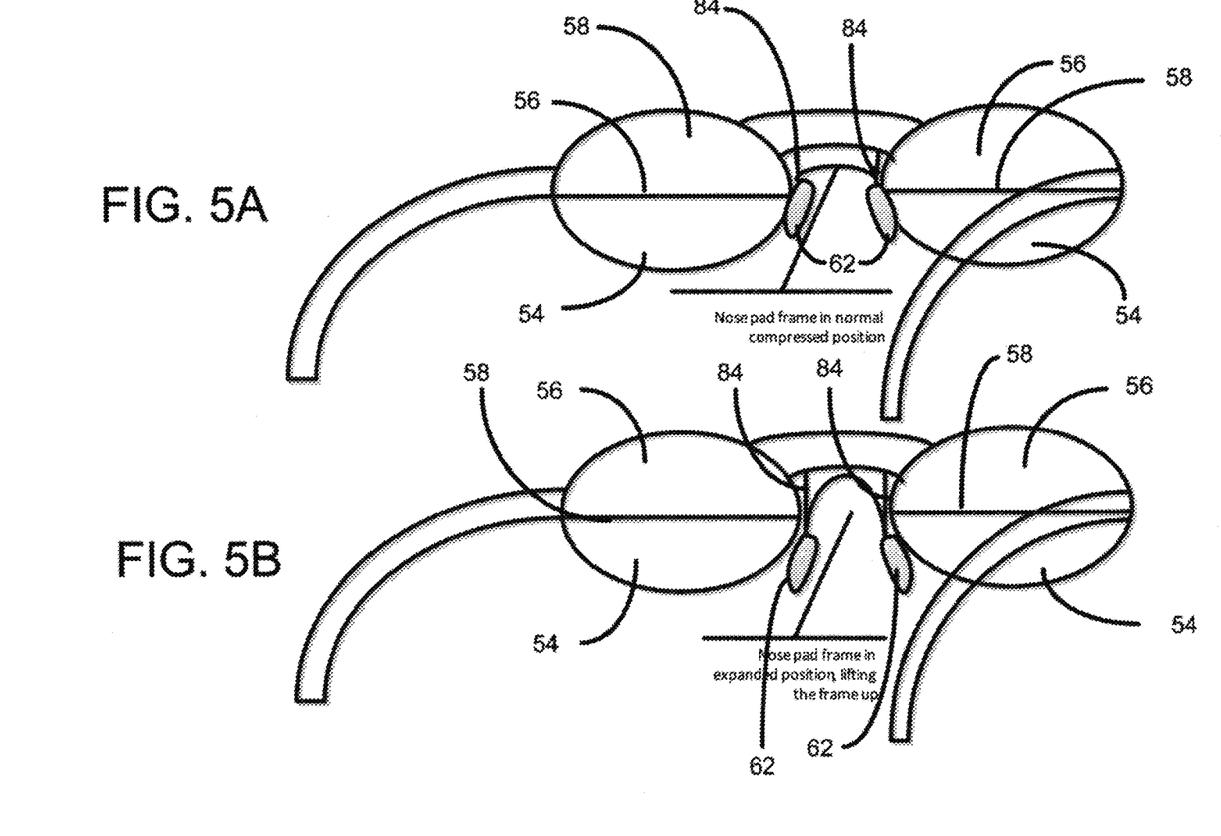
FIG. 5A is a rear view of the smart glasses in the compressed position of FIG. 4A.
FIG. 5B is a rear view of the smart glasses in the expanded position of FIG. 4B.

FIG. 4A illustrates the smart glasses 10 worn by a user 80 utilizing the far focus section 56. As depicted in FIG. 4A, the nose pads 62 are compressed, thereby allowing the user's eyes 82 to view through the far focus section 56. FIG. 4B illustrates the smart glasses 10 worn by the user 80 utilizing the near focus section 54. As depicted in FIG. 4B, a nose pad section 84 is elongated or lifted upwards as discussed above. The frame 30 or the lower lens section 54 is raised to be placed in front of the user's eyes 82, thereby allowing the user to view through the near focus lens section 54. FIG. 5A is a rear view of the smart glasses 10 in the compressed position of FIG. 4A. FIG. 5B is a rear view of the smart glasses 10 in the expanded position of FIG. 4B.

Figure 6A:
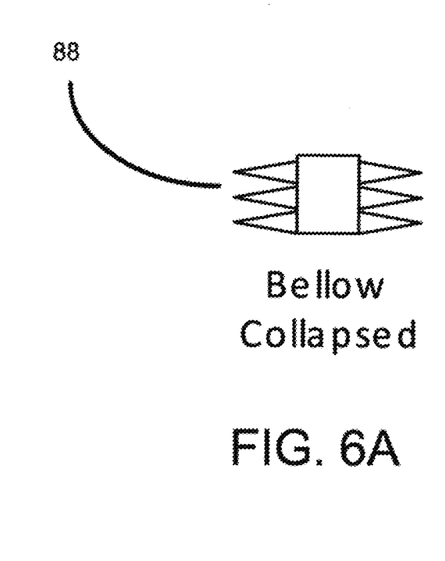
FIG. 6A illustrates the bellow in a collapsed position.
Figure 6B:
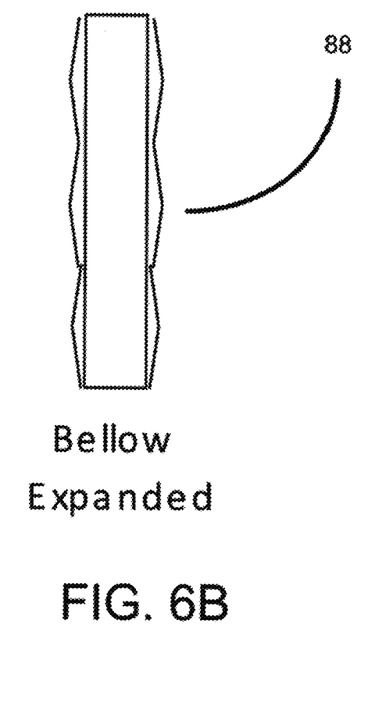
FIG. 6B illustrates the bellow in an expanded position.

There are various ways in which the frame may be lifted. In one embodiment, an airbag in the frame supporting the nose pad can be a bellow 88 or other similar expandable structures may be used. This bellow expands with air pressure and collapse with air release. Additional mechanical guides are provided around the bellows to guide the frame in a proper direction. The bellow may be incorporated in the nose pad section 84 or other section adjacent the user's nose. FIG. 6A illustrates the bellow 88 in a collapsed position. FIG. 68 illustrates the bellow in an expanded position. When in the collapsed position, the user sees through the far focus section 56 as depicted in FIG. 4A. When it is determined the user wishes to view objects up close, the bellow is expanded as depicted in FIG. 6B and the frame is raised, thereby positioning the near focus lens 54 in front of the user's eyes 82.

Figure 7A:
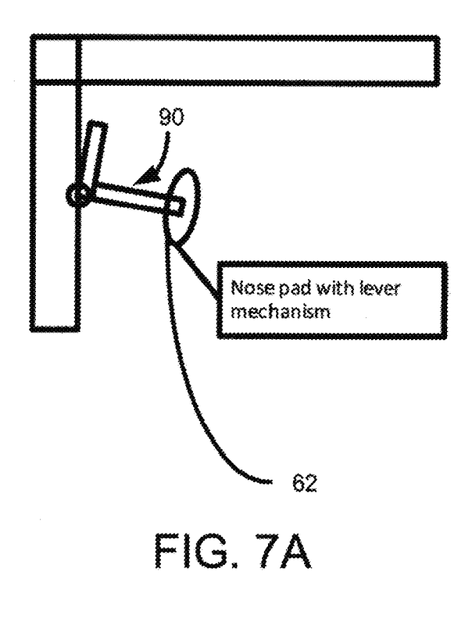
FIG. 7A is a front view of a lever mechanism in a low position.
Figure 7B:
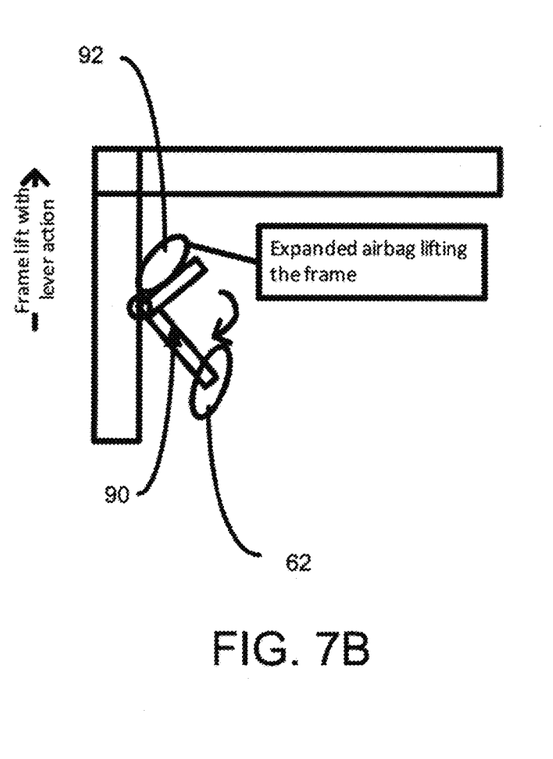
FIG. 7B is a front view of the lever mechanism in an elevated position.

FIG. 7A is a front view of a lever mechanism 90 in a low position. FIG. 7B is a front view of the lever mechanism 90 in an elevated position. In this embodiment, the lever mechanism is rotatable and located about a pivot point within the nose pad region, such as the nose pad section 84. An airbag 92 is inflated and located inside the lever mechanism 90 that attaches the frame to the nose pad. When the airbag 92 expands, it pushes and rotates the lever mechanism. With the nose pad firmly sitting on the user's nose, this rotating action moves the frame up. As depicted in FIG. 7A, the airbag is deflated, and the lever is in such a position as the frame 30 is in a low position. When desired for viewing through the near focus lens section 54, the frame may be raised. FIG. 7B depicts the frame being raised by the lever mechanism 90 when the airbag 92 is inflated.

Figure 8A:
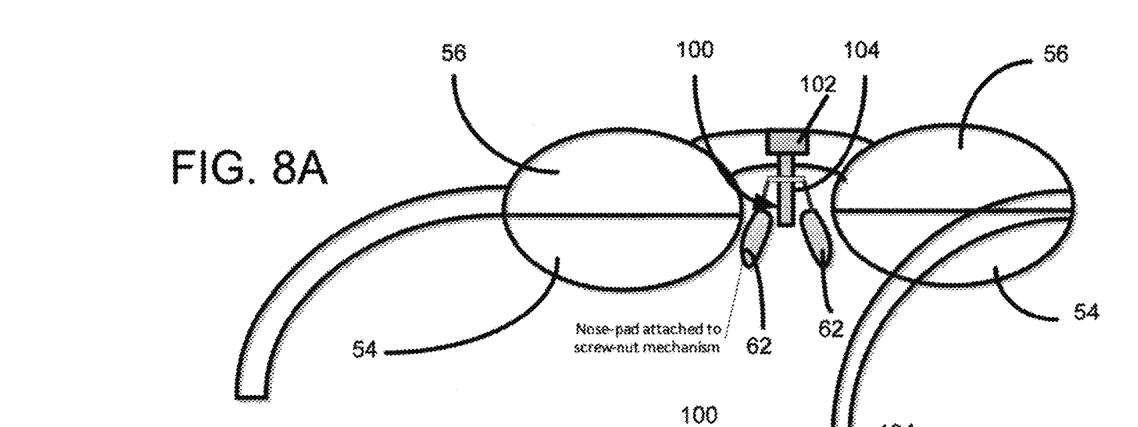
FIG. 8A illustrates the smart glasses having the screw drive assembly in a lowered position.
Figure 8B:
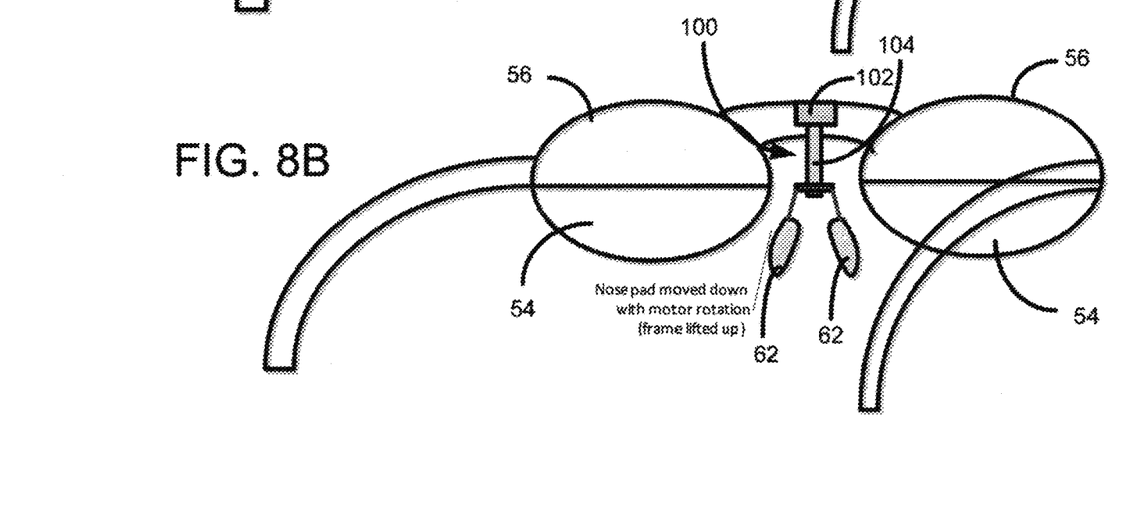
FIG. 8B illustrates the smart glasses having the screw drive assembly in an elevated position.

In another embodiment, a screw drive assembly 100 may be utilized to raise the frame 30. FIG. 8A illustrates the smart glasses 10 having the screw drive assembly 100 in a lowered position. FIG. 8B illustrates the smart glasses 10 having the screw drive assembly 100 in an elevated position. The screw drive assembly utilizes a micro-motor 102 to drive up a rotatable shaft 104. Rotation of the motor drives the shaft 104 up and down. While the motor is mounted on the frame, the nose pad is attached to the shaft 104. Rotation in one direction of the shaft moves the nose pad down, resulting in lifting of the frame. Rotation in the opposite direction moves the shaft 104 up, resulting in lowering of the frame. When the far focus is desired, the shaft 104 is lowered as depicted in FIG. 8A. If it is desired to view the near focus lens section 54, the shaft 104 is rotated in the opposite direct, thereby driving the nose pads 62 upward as shown in FIG. FIG. 8B. The micro-motor may be an ultra-compact piezo motor that moves shaft 104 with piezo distortions on surfaces touching the shaft.

Figures 9A, 9B:
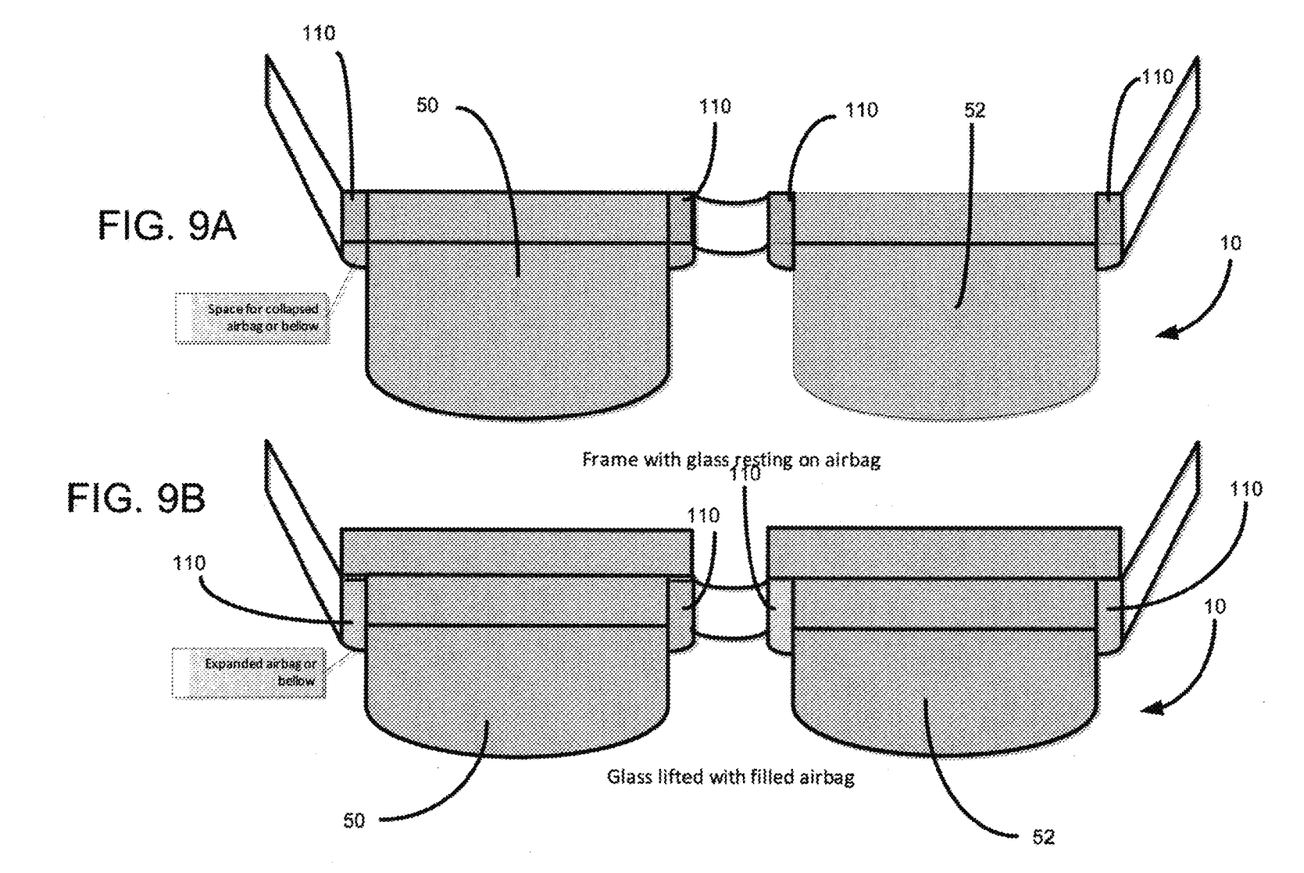
FIG. 9A illustrates the smart glasses utilizing airbags to move the lenses within the frame in the low position.

In another embodiment, the lens itself may be moved within the frame. This provides a more discrete solution where outsiders would not notice frame moving. Space is made within the frame for the motion of the lens. FIG. 9A illustrates the smart glasses utilizing airbags 110 to move the lenses within the frame 30 in the low position. FIG. 9B illustrates the smart glasses utilizing airbags 110 to move the lenses within the frame 30 in an elevated position. In one embodiment of the present invention, this motion is achieved with pneumatic airbags 110 or bellows. The lenses 50 and 52 rest on the airbag or bellows inside the frame. Pumping air into these airbags lift the lenses up within the frame. Each lens is lifted individually by airbags pushing-up from one side or from both sides. If far focus is desired, where the user wishes to view through the far focus lens section 56, the airbags or bellows are collapsed, as shown in FIG. 9A. If the near focus lens segment is to be used, the airbag 110 or bellows are inflated, thereby raising the lenses 50 and 52 upward.

Figure 10:
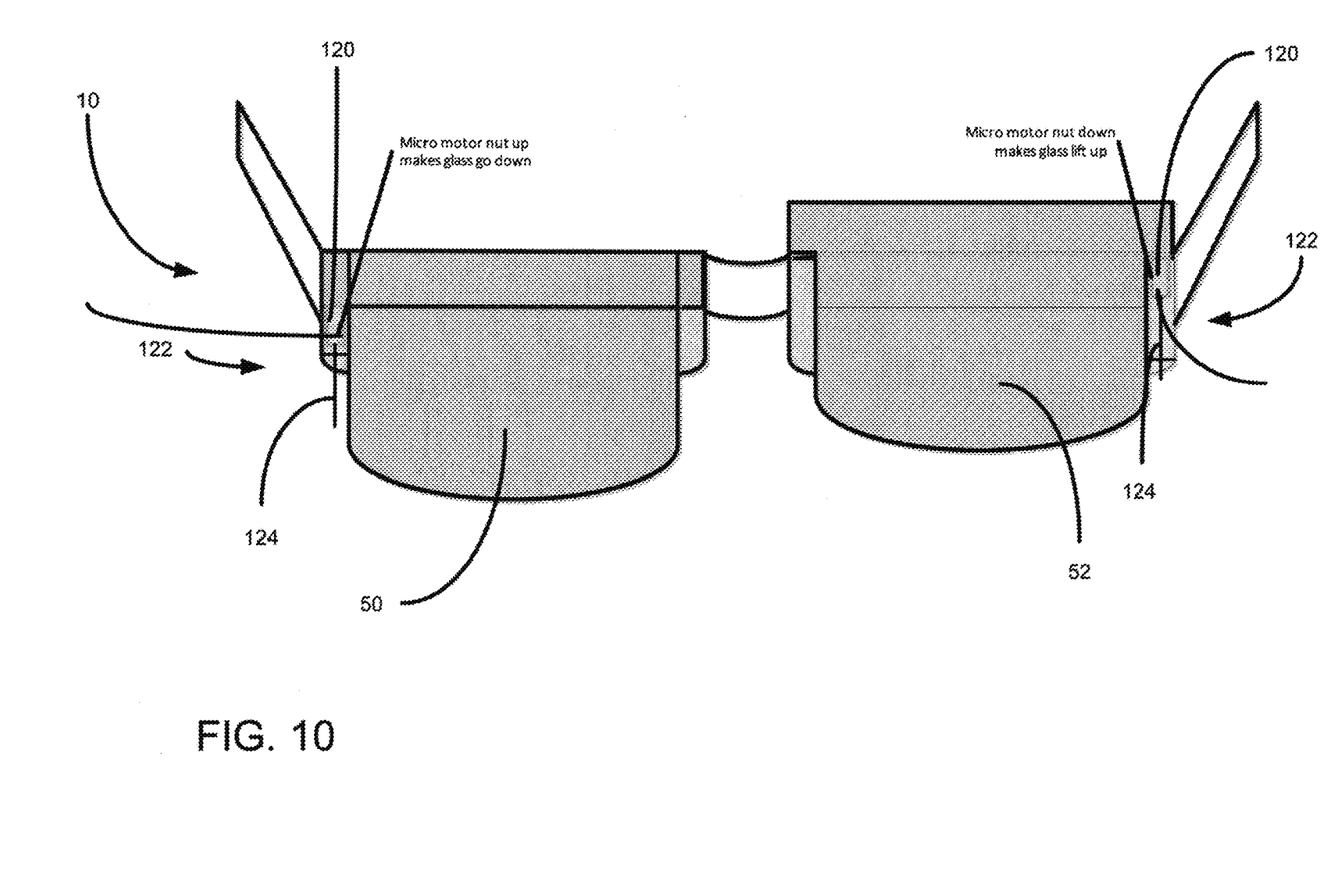
FIG. 10 illustrates the screw assembly to raise and lower the lenses.

In another embodiment, the lenses 50 and 52 may be moved by micro-motors 120 using a screw assembly 122 to drive a rotatable shaft 124. The screw assembly is attached to the lenses, one for each lens. In this embodiment, the shaft rotates in one direct, thereby raising the lens. FIG. 10 illustrates the screw assembly to raise and lower the lenses 50 and 52. As depicted in FIG. 10, the lens 50 is shown in the lower position while lens 52 is elevated.

Figure 11A:
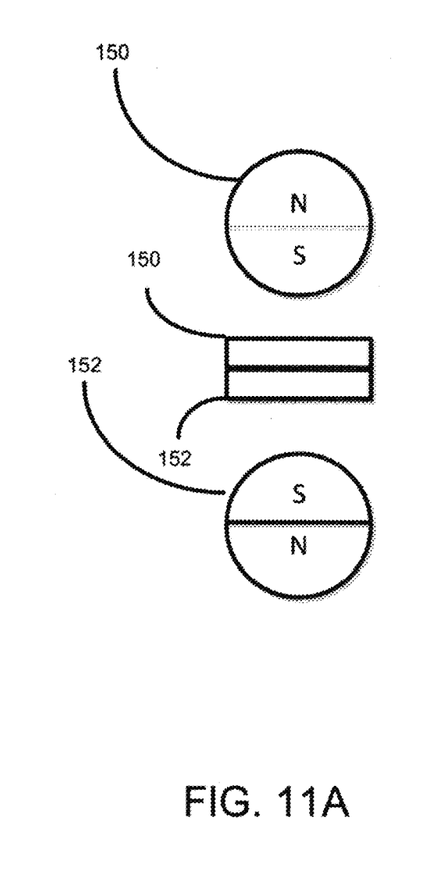
FIG. 11A illustrates two rotating magnets stacked upon each other.
Figure 11B:
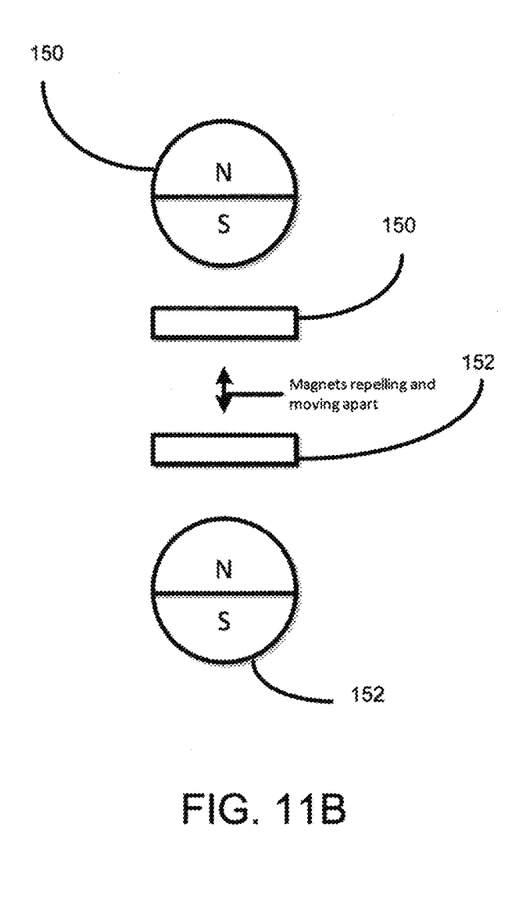
FIG. 11B illustrates the two rotating magnets repelling each other.

In still another embodiment, the movement of the lenses 50 and 52 may be accomplished by the use of magnets. Two rotating magnets 150 and 152 with N-S polarity are stacked on each other. When the poles are reversed on this stack, they attract to join. When one of the magnets is rotated by 180 degrees, the magnets face the same pole and repel to move apart. This movement provides lift for the lenses. FIG. 11A illustrates the two rotating magnets stacked upon each other. In this position, the lenses are in the lower position. FIG. 11B illustrates the two rotating magnets repelling each other. In this position, the frame or lens is raised by the repelling magnetic forces.

Figure 12A:
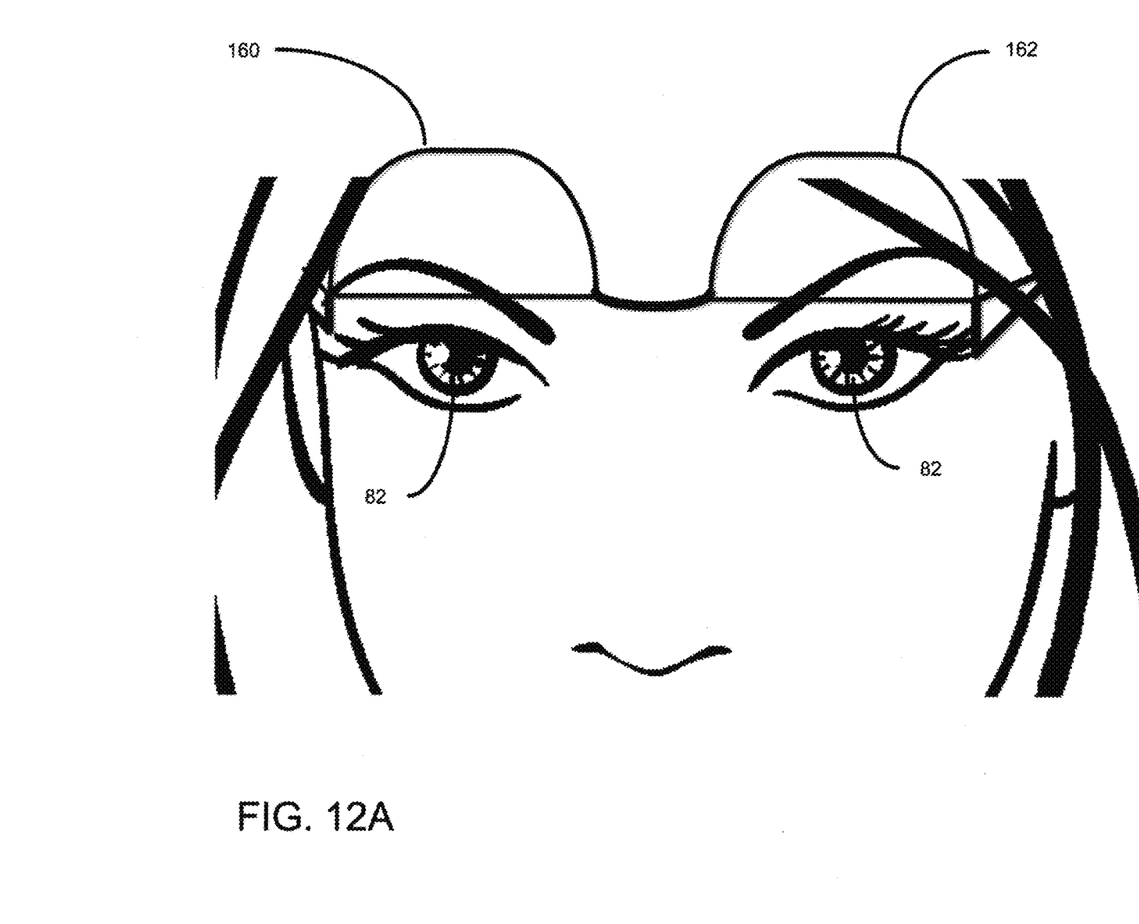
FIG. 12A illustrates the lenses in the up position, away from the user's eyes.
Figure 12B:
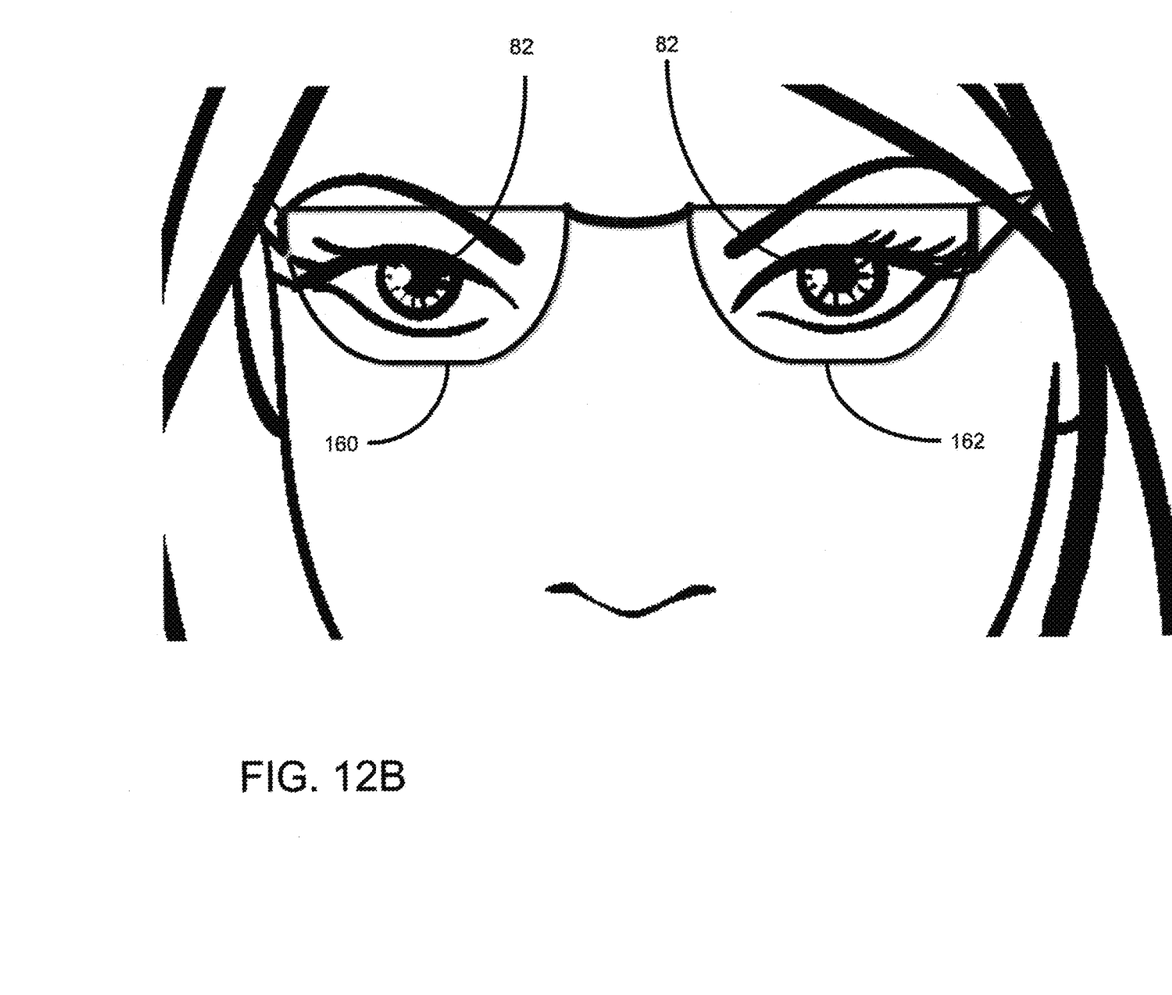
FIG. 12B illustrates the lenses in the down position.

In another embodiment, a flip version of the lenses may be utilized. In this embodiment, each lens 160 and 162 have just one lens segment, such as a near focus reading lens. When the user is viewing far objects, the lens will rotate 180 degrees and rest on user's forehead. When the user sees the near objects, the lens will flip down to give near focus to the user. FIG. 12A illustrates the lenses 160 and 162 in the up position, away from the user's eyes 82. FIG. 128 illustrates the lenses 160 and 162 in the down position, thereby placing the lenses 160 and 162 in front of the user's eyes 82.

In one embodiment of the present invention, the optional camera 22 may be integrated in the frame 30 to detect what the user is viewing. This information can supplement the distance measurement module 20 for determining if the lens movement is necessary. There can be instances where the user is seeing an object close to the user but does not need focus adjustment. For example, the user is seeing a seat in front of the user while sitting on airplane, where focus change is not needed. The controller 12, utilizing information from the camera, determines that the object being viewed by the user does not have fine detail and thus does not require focus adjustment. The image from the camera is analyzed for any fine detail. Techniques such as histogram analysis of the image may be used to determine if there is fine detail in the image. The lens position is adjusted only when the object viewed by the user is near and contains fine detail.

In still another embodiment, the optional audio speaker 42 may be integrated into the frame 30, preferably near the user's temple area to provide additional information to the user. The speaker may fire audio directly towards user's ear in a semi-private mode, thus providing audio to the user. The optionally speaker may be extendable and moved down to sit on top of the user's ear for closed ear music or other functionality. The audio speaker, in one embodiment, may dictate information to the user. This information may include the current mode of the smart glasses 10, i.e., auto or manual mode and status of the battery. Additionally, the speaker may also provide information through voice commands or play music.

In another embodiment, the components integrated in the smart reading glass may be used for additional applications, such as to assist blind or visually impaired users. The distance measurement module 20 may be utilized to measure the distance to an object to which the user's head is pointing at. This distance information may be conveyed to the user through the integrated speaker 42. A user may get a sense of the distance of objects around the user by turning the user's head and looking at the objects. The speaker may play a tone to the user. Based on the distance to the object the user is viewing, the tone pitch is increased or reduced. Alternately, the tone volume can be increased or reduced based on the object distance. The user may look around to hear distance to objects around him. In the case of moving objects, the tone frequency may change dynamically as the object approaches or moves away. In case of vehicles approaching the user, the tone frequency increases. This information can be useful for a blind or visually impaired user who is crossing the street. The camera 22 may broadcast video from the user's point of view to a remote assistant. This remote assistant may assist the user in directing the user through the speaker. The user and remote person can communicate with each other with the integrated mic 60 and speaker 42.

Additionally, the present invention may be useful for users that are hearing impaired. The speaker 42 may be utilized as a hearing air. In one embodiment, the speaker may be slid down to the user's ear to sit and positioned inside the user's ear.

The present invention provides may features currently unavailable in existing glasses. The present invention enables the changing of lenses automatically or manually to allow near and far focus lenses to be positioned in front of the user's eyes. The present invention may accomplish this in a wide variety of ways to move the lenses to the appropriate position.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. Glasses comprising:
a frame;
a first lens affixed to the frame;
a second lens affixed to the frame, the second lens positioned adjacent the first lens;
a distance measurement module for determining a distance to an object view from the glasses;
a motion control module for raising and lowering the first and second lens;
a controller for determining when it is appropriate to raise the first and second lens;
wherein when the controller determines that it is appropriate to move the first and second lens to a new position, the controller directs the motion control module to move the first and second lens.

2. The glasses according to claim 1 wherein:
the first lens includes a plurality of first lens sections;
the second lens includes a plurality of second lens sections.

3. The glasses according to claim 2 wherein:
the plurality of first lens sections includes a first upper lens section and a first lower lens section;
the plurality of second lens sections includes a second upper lens section and a second lower lens section;
whereby a user wears the glasses and the first and second lenses are in a low position to allow viewing through the first and second upper lens sections and in the new position to allow viewing through the first and second lower lens.

4. The glasses according to claim 2 wherein:
the plurality of first lens sections includes a first upper lens section, a first lower lens section and a first intermediate level section;
the plurality of second lens sections includes a second upper lens section, a second lower lens section, and a second intermediate level section;
whereby a user wears the glasses and the first and second lenses are in a low position to allow viewing through the first and second upper lens sections, in the new position to allow viewing through the first and second lower lens, and in an intermediate position to allow viewing through the first and second intermediate level section.

5. The glasses according to claim 1 wherein the distance measurement module measures distance to object via a time of flight measuring mechanism.

6. The glasses according to claim 1 wherein the distance measurement module determines a distance to object by measuring eye position and angle of viewing of the user.

7. The glasses according to claim 6 wherein the pump is a piezo pump.

8. The glasses according to claim 7 wherein the micromotor is a piezo motor that moves the screw assembly through internal distortions.

9. The glasses according to claim 1 wherein the movement of the first and second lenses changes a focus of view of the user.

10. The glasses according to claim 1 wherein the frame includes a plurality of nose pads and the frame with the first and second lenses are raised by inflating an expandable mechanism attached to the plurality of nose pads.

11. The glasses according to claim 1 wherein the first and second lenses are raised by pumping fluid from a micropump.

12. The glasses according to claim 1 wherein the frame and the first and second lenses are raised by a lever mechanism that is driven by an inflatable airbag.

13. The glasses according to claim 1 wherein the frame and the first and second lenses are raise by a micro-motor and a rotatable screw assembly.

14. The glasses according to claim 1 wherein the first and second lenses are raised with the frame.

15. The glasses according to claim 1 wherein the first and second lenses are raised while the frame remains stationary.

16. The glasses according to claim 15 wherein the first and second lenses are raised by inflating an airbag.

17. The glasses according to claim 15 wherein the first and second lenses are raised by a micro-motor and a rotatable screw assembly.

18. The glasses according to claim 15 wherein the motion control module raises the first and second lenses by a plurality of magnets generating an attracting and repelling magnetic force.

19. The glasses according to claim 1 further comprising a camera providing information to the controller of the nature of the viewed object.

20. The glasses according to claim 1 further comprising a speaker providing information to the user.

21. The glasses according to claim 20 wherein the speaker includes direct firing audio to an ear of the user.

22. The glasses according to claim 20 wherein the speaker is extendable to be positioned in an ear of the user.

23. The glasses according to claim 1 further comprising a speaker for use as a hearing aid.

\* \* \* \* \*